May 14, 1957  T. K. SANDY  2,792,004
POULTRY BEAK TRIMMING MACHINE
Filed Aug. 4, 1955

INVENTOR
Turner K. Sandy
BY Mason, Fenwick & Lawrence
ATTORNEYS

United States Patent Office 2,792,004
Patented May 14, 1957

2,792,004

POULTRY BEAK TRIMMING MACHINE

Turner K. Sandy, Broadway, Va.

Application August 4, 1955, Serial No. 526,423

7 Claims. (Cl. 128—303.1)

This invention relates to devices for trimming the beaks of poultry.

It has become quite prevalent among poultry raisers to trim the beaks of the birds to prevent cannibalism. It greatly reduces pecking at sick or injured birds. This trimming, if properly done, does not hurt the bird when done, affect its future health, or interfere with eating, drinking or breathing. The trimming is usually done before the poult is more than a few days old. It is difficult, however, to manually trim the small beak at exactly the right angle and to the desired extent. The preferred cut is angularly toward the rear of the top beak with the cut ending just in front of the nostrils. Only the very tip of the lower beak is cut away.

The primary object of the present invention is to provide a machine for trimming the beaks of poultry and, at the same time, cauterizing the cut surface.

Another object of the invention is to provide in a device of this kind an oscillatable carriage with an opening to receive the beak and carry it across a saw and cauterizer to first cut, then sear the beak.

Yet another object is the provision of such a machine in which the beak-receiving opening is shaped to automatically position the beak and present it at the proper angle to the saw.

Other objects of the invention will become apparent from the following description of one practical embodiment thereof, when taken in conjunction with the drawings which accompany, and form part of, this specification.

In the drawings:

Figure 3 is an enlarged detail sectional view through a portion of the carriage, illustrating the beak-receiving opening; and, Figure 4 is a partial end elevation of the carriage showing the position of the beak-receiving opening with respect to the saw and cauterizer when the carriage is at rest.

Figure 1:
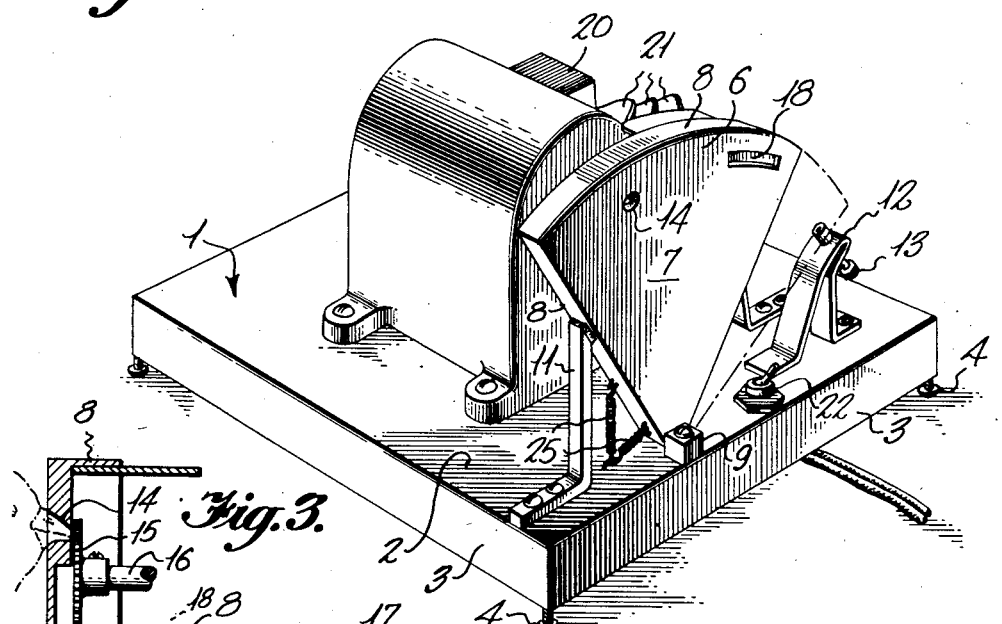
Figure 1 is a perspective view of a beak trimming machine embodying the principles of the present invention.
Figure 2:
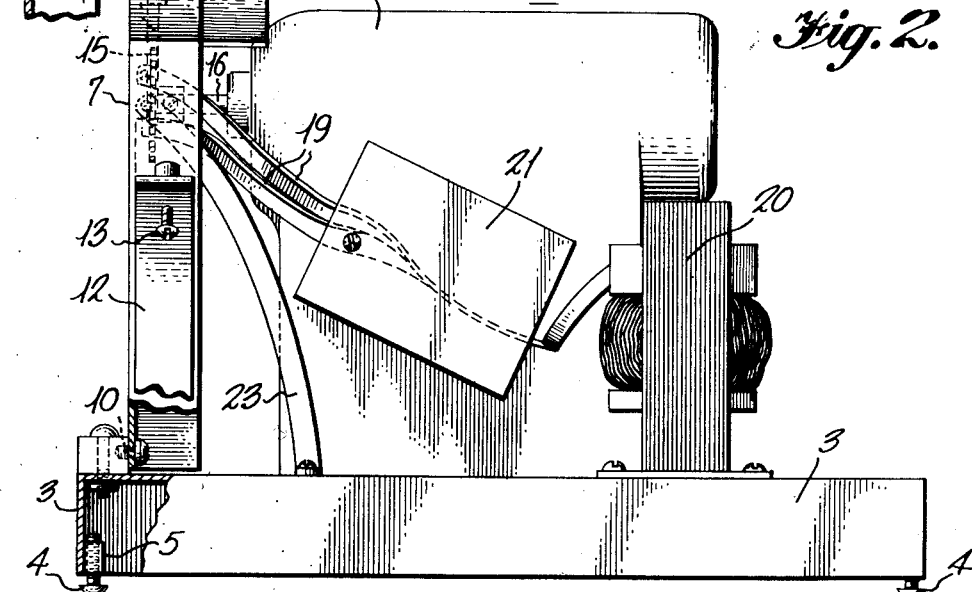
Figure 2 is a side view of the machine, parts being broken away.
Figure 4:
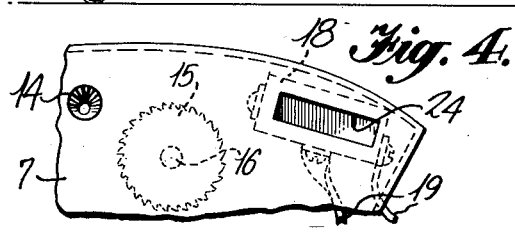

Referring to the drawings in detail, the machine is shown as having its operating parts mounted upon a base 1. The base may be solid, but is shown as having a floor 2 with downturned peripheral flanges 3. Feet 4 are provided and made adjustable by having threaded legs screwed into bosses 5 at the inner corners of the flanges 3. By adjusting the feet, the base may be made level and rigid on any surface.

A carriage 6 is mounted upon the base for swinging movement transversely of the base. The carriage is of sector-shape, and has a vertical wall 7 forming its outer face and the peripheral flanges 8 forming the top and sides of the carriage. The inner side of the carriage is open. The carriage is mounted, with its apex downward, against a block 9. The block may be an integral part of the base, or separate and attached in any convenient manner. A pivot pin 10 connects the carriage to the block.

Stops, in the form of brackets 11 and 12, are fixed upon the base and limit the swinging movement of the carriage. Stop 11 determines the at rest position of the carriage and stop 12 the limit of operative carriage movement. An adjustable stop screw 13 is threaded into the bracket 12 to form an abutment for the carriage, so that the carriage throw may be varied.

Near its top, the carriage is provided with a beak-receiving opening 14. The shape and arrangement of the opening will be described in detail later.

Positioned beyond the opening 14 when the carriage is at rest and in the direction of carriage travel, there is a trimming saw 15. The saw is circular, and mounted so that the path of movement of the opening 14 will intercept its upper arc. The saw is mounted upon shaft 16 of a motor 17 mounted at the rear of the carriage on the base 1. The saw is located closely adjacent the inner face of the carriage so that beaks will be cut off close to the end of the beak opening in the carriage.

A cauterizer 18, in the form of a flat plate, is arranged in the plane of the saw and on the arc of movement of the beak-receiving opening. It is positioned beyond the saw in the direction of carriage movement. The cauterizer is of electrical resistant material, and is connected by the leads 19 to any convenient source of electric power. A transformer 20, to suitably step down the voltage, is interposed in the line. If found necessary, baffles or fins 21 may be placed in contact with the lead wires between the cauterizer and the transformer so that heat conducted by the wires from the transformer will be dissipated before reaching the transformer. The motor 17 is also connected into the circuit so that both motor and cauterizer will be in operation simultaneously. Any suitable switch 22 may be interposed in the circuit to control the cauterizer and motor. The cauterizer is shown as supported upon a bracket 23 mounted upon the base 1. The bracket curves forwardly so that the cauterizer may be adjacent the front wall of the carriage, yet the bracket mounting be well outside the carriage so as not to interfere with its free movement. The carriage is provided with a window 24 in its front wall to expose the cauterizer when the carriage is at its position of rest against the stop 11.

Referring again to the beak-receiving opening 14, it will be noted from Figure 3 that the wall of the carriage is considerably thickened in the area of the opening. This is to enable the opening to have substantial depth so that it may encompass the entire beak. The opening is to be shaped to conform to a beak, and its angular arrangement is such that when the beak is seated in the opening the beak will protrude just the right amount and at just the proper angle with respect to the saw to ensure a correct cut.

In operating the device the switch is turned on to start the saw and heat the cauterizer. A poult is then picked up and its beak inserted in the opening 14. It will seat in the opening and be properly positioned, as described. The carriage is rocked causing the projecting portion of the beak to be presented to the saw and then to the cauterizer. The saw rotates at high speed and will cut cleanly and without pain to the bird. The cauterizer will sear the cut surface to seal and sterilize it. The carriage will be returned to its position of rest automatically by means of the coil springs 25 which are connected to the carriage and the base. If the cut surface of the beak is not properly cauterized by its original contact, it may be touched against the cauterizer through the opening 24.

While in the above one practical embodiment of the invention has been disclosed, it will be understood that the details of construction shown and described are merely by way of example and the invention may take other forms within the scope of the appended claims.

What is claimed is:

1. A machine for trimming the beaks of poultry comprising, a base, a carriage pivotally mounted on said base for rocking movement, said carriage including a wall having an opening therein through which the beaks of poultry may be projected to protrude beyond said wall, a circular saw blade supported for rotation on said base closely adjacent said wall and positioned to intersect the projected axis of said opening when said carriage is rocked, and motor means for rotating said saw blade.

2. A machine for trimming the beaks of poultry comprising, a base, a carriage pivotally mounted on said base for rocking movement, said carriage including a wall having an opening therein through which the beaks of poultry may be projected to protrude beyond said wall, a circular saw blade supported for rotation on said base closely adjacent said wall and positioned to intercept the projected axis of said opening when said carriage is rocked, and motor means for rotating said saw blade, the bounding surface of said opening in said carriage wall being shaped to conform to the surface of the portion of a poultry beak lying within said opening when the beak is projected therethrough to engage and position the beaks in position for proper presentation to the saw blade.

3. In a machine for trimming the beaks of poultry, the combination recited in claim 1, including a cauterizer fixed in position closely adjacent said wall beyond said saw blade in the direction of operative movement of said carriage and positioned in a vertical plane including said saw blade.

4. In a machine for trimming the beaks of poultry, the combination recited in claim 1, including stops on said base in the path of rocking movement of said carriage, one of said stops determining a position of rest for said carriage and another the limit of operative movement of said carriage, and means extending between said carriage and said base for yieldingly holding said carriage in its position of rest.

5. In a machine for trimming the beaks of poultry, the combination recited in claim 1, wherein the bounding surfaces of said opening in said carriage wall are shaped complementary to the portion of a poultry beak over a major portion of the beak adjacent the base thereof to engage said beak portion and position the beaks in position for proper presentation to the saw blade, and cauterizing means including a cauterizing member fixed in position closely adjacent said wall beyond said saw blade in the direction of operative movement of said carriage and positioned in a vertical plane including said saw blade.

6. In a machine for trimming the beaks of poultry, the combination recited in claim 1, stops on said base in the path of rocking movement of said carriage, one of said stops determining a position of rest for said carriage and another the limit of operative movement of said carriage, means extending between said carriage and said base for yieldingly holding said carriage in its position of rest, a cauterizer fixed in position closely adjacent said wall beyond said saw blade in the direction of operative movement of said carriage and positioned in a vertical plane including said saw blade.

7. A machine for trimming the beaks of poultry comprising, a base, a carriage pivotally mounted on said base for rocking movement, said carriage including a wall having an opening therein through which the beaks of poultry may be projected to protrude beyond said wall, a circular saw blade supported for rotation on said base closely adjacent said wall and positioned to intercept the projected axis of said opening when said carriage is rocked, and motor means for rotating said saw blade, the bounding surface of said opening in said carriage wall being shaped to conform to the surface of the portion of a poultry beak lying within said opening when the beak is projected therethrough to engage the surface of the beaks and position the beaks in position for proper presentation to the saw blade, cauterizing means including a cauterizing plate fixed in position closely adjacent said wall beyond said saw blade in the direction of operative movement of said carriage and positioned in a vertical plane including said saw blade, stops on said base in the path of rocking movement of said carriage, one of said stops determining a position of rest for said carriage and another the limit of operative movement of said carriage, and means extending between said carriage and said base for yieldingly holding said carriage in its position of rest.

References Cited in the file of this patent

UNITED STATES PATENTS

| | | |
|---|---|---|
| 1,497,975 | Flick et al. | June 17, 1924 |
| 1,584,444 | Flick | May 11, 1926 |